(No Model.) 2 Sheets—Sheet 1.
M. J. WIGHTMAN.
REGULATING THE SPEED OF ELECTRIC MOTORS.
No. 460,614. Patented Oct. 6, 1891.
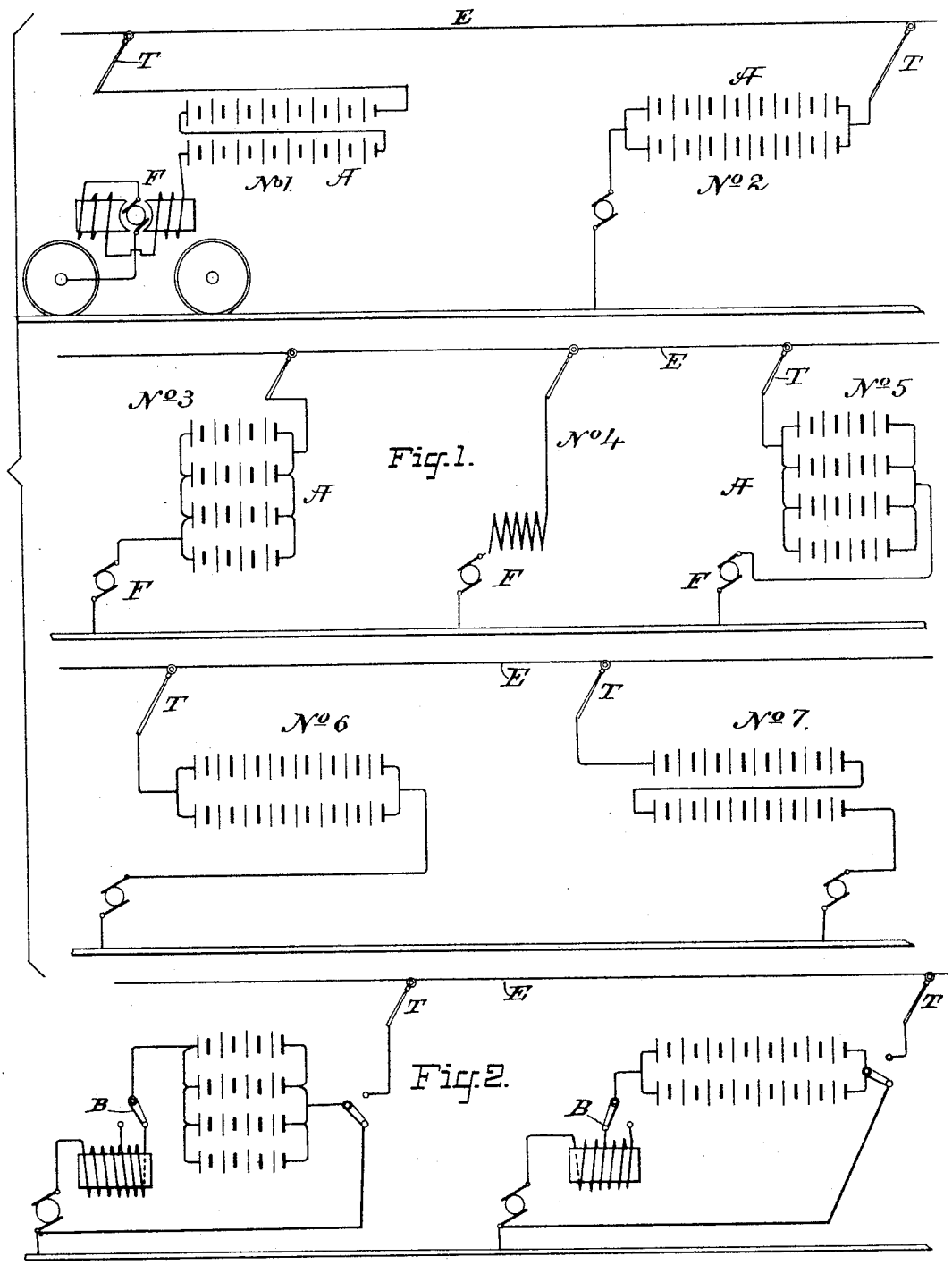
ATTEST:
J. A. Hurdle
J. F. Courey
INVENTOR:
Merle J. Wightman
By H. L. Townsend
Attorney (No Model.) 2 Sheets—Sheet 2.
M. J. WIGHTMAN.
REGULATING THE SPEED OF ELECTRIC MOTORS.
No. 460,614. Patented Oct. 6, 1891.
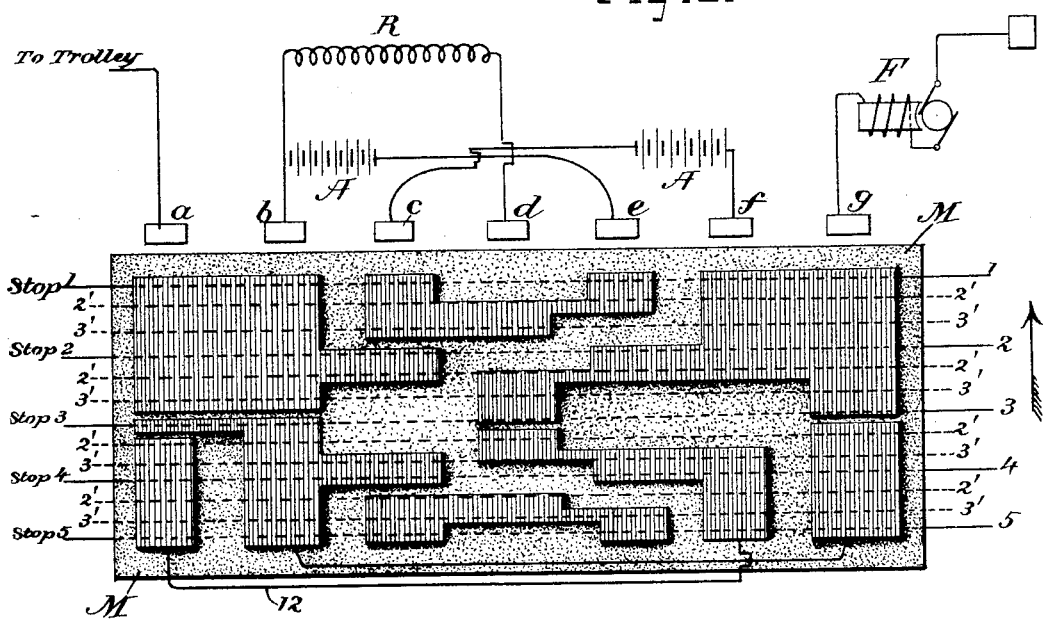

UNITED STATES PATENT OFFICE.

MERLE J. WIGHTMAN, OF SCRANTON, PENNSYLVANIA.

REGULATING THE SPEED OF ELECTRIC MOTORS.

SPECIFICATION forming part of Letters Patent No. 460,614, dated October 6, 1891.

Application filed February 28, 1891. Serial No. 383,150. (No model.)

*To all whom it may concern:*

Be it known that I, MERLE J. WIGHTMAN, a citizen of the United States, and a resident of Scranton, in the county of Lackawanna and State of Pennsylvania, have invented a certain new and useful Improvements in Regulating the Speed of Electric Motors, of which the following is a specification.

My invention relates to a novel method of and apparatus for regulating the speed of electric motors run from constant or approximately-constant potential mains, and is especially applicable to electric-railway motors.

It has heretofore been proposed to regulate the speed of a railway-motor run from a constant potential circuit by interposing in the circuit from the feed wire or main, through the motor to the return connection, an artificial resistance which is adjusted so as to oppose its maximum resistance at the start, and is then gradually cut out to increase the speed.

My invention consists in introducing in the circuit of the motor between the same and the supply-wire a storage-battery in place of the ordinary rheostat, which at starting the motor or at slow speed will oppose the flow of current, and at the same time store up the energy, cutting out said battery to allow the motor to run at an increased speed, and then restoring the battery to its connection in the circuit between the motor and the supply-wire, but in reverse position, so that the discharge therefrom will assist the current of the main when a still further increase of speed is desired.

My invention consists, further, in interposing in the circuit of the motor at the start a storage-battery in place of the ordinary rheostat, which will oppose the flow of current, and at the same time store up the energy, and then connecting up the cells of the battery in different combinations, so as to decrease the resistance for the purpose of increasing the speed.

My invention consists, further, in regulating the speed of an electric motor run from a constant potential main by interposing storage-battery cells in the circuit of the motor at the start, connecting up the cells in different combinations to decrease the resistance for increasing the speed, and finally reversing the battery in the motor connections to produce further increase, at the same time, if desired, connecting the cells in different combinations, so as to gradually increase the electro-motive force supplied from the battery.

My invention consists, further, in special methods and combinations of apparatus, as hereinafter more particularly described, and then specified in the claims.

In carrying out my invention the number of storage-cells employed as a resistance would depend upon the particular circumstances of use. In employing them in accordance with my invention the batteries would at the start be connected up preferably all in series with the motor. The next step in the regulation would be to increase the number of cells in parallel and decrease the number in series. This step might involve simply the changing or switching of the cells into two parallel connections, thereby decreasing the number in series one-half, or, if desired, the second step in regulation might involve the formation of a larger number of parallel connections and a corresponding decrease of the number of cells in each series. The object of the change would be to put the batteries into a different combination to decrease their resistance to the flow of the current from the supply-wire through the motor. A further graduation of effect might be obtained by still further increasing the number of cells in parallel, and of course at the same time decreasing the number in series; but the number of steps or the extent of the change at each step does not form any special part of my invention. After carrying the changes in the number of cells in parallel and in series to the desired extent the battery may be cut out to leave the motor subject only to the influence of the current derived from the main supply-wire. After this point is reached the special advantage in the use of storage-batteries arises, since, by reversing the direction by which they are placed in circuit, their charge or voltage may be added to the voltage of the line. When first so placed in circuit, they would be arranged in combination to give the smallest electro-motive force—that is to say, the number of multiple connections would be the maximum and the number of cells in each series connection the minimum. The next step in the operation to produce further increase of speed would be to decrease the number of parallel connections and increase the number of cells in each connection in series. The effect of these changes would be obviously to increase the total voltage in the motor-driving circuit. The changes may be carried to the final connection of all the batteries in one series connection, if desired. By thus employing the storage-battery I am enabled to use a higher-voltage motor, and since a higher-voltage motor has a larger number of turns than one which attains full speed at a pressure, say, of five hundred volts, this motor would have for a given current more torque or turning power at the start. We have, therefore, a double saving by the use of storage-batteries according to this method, a saving due to the smaller current that is required to start the motor and to run at slow speeds, and that due to a return of the energy usually absorbed in resistance at high speeds. A still further advantage is obtained by this storage system, and that is that the car can be operated independently of the trolley-wire for a time, depending upon the size of the batteries and the proportion of the energy that is thrown into the storage-batteries when the car is doing its average work. This power of the car to run short distances independently of the trolley-wire would be of great value and would offset the disadvantages of the increase in weight of the car as a whole, due to the carrying of storage-batteries. By this system of regulation a car could run in the center of a town for twenty minutes or half an hour with the charge that it had picked up under the process of regulation when making its maximum journey in the outskirts of the town where a trolley-wire could be used. A storage-battery car requires three thousand pounds and will run forty miles. We might say that ten miles would be the maximum distance required to run without trolley-wire connections, and eight hundred pounds of battery would store up sufficient power for this purpose. Of course the motor can be so proportioned as to cause the batteries to be charged with an amount of power which would be greatly in excess of that usually lost in the ordinary resistance regulation. The relative proportions of power in batteries and motor would be a subject for simple calculation when average speed and distance were known.

For the sake of illustrating my invention I have shown and described it as carried out by producing two changes only in the combination of the batteries between the initial connection of all the cells in series with one another and the cutting out of the battery to leave the motor to the action of the current from the supply-wire unopposed. I have also shown and described three different combinations only of the battery after the same is reversed in the connection of the motor to add its voltage to that of the supply-wire. As hereinbefore indicated, however, the number of changes may be increased or diminished and other modifications or variations in the use of the apparatus employed.

In the accompanying drawings, Figure 1 illustrates, diagrammatrically, seven several stages of regulation produced by the employment of a battery and suitable switching connections for connecting the battery-cells in three different combinations and placing them in circuit to receive a charge by the current which excites the motor or reversing their connection after charge and in circuit with the motor to add their voltage. One of the changes or steps included in the seven is the removal of the batteries from the motor connection. Fig. 2 is a diagram illustrating the use of the battery to run the motor independently of the supply-wire. Fig. 3 is a plan of an arrangement of switch-plates and contacts that may be used.

E is any electric supply-wire charged with constant potential and supplying current to an electric motor F through a trolley T or other collecting device. The trolley would be used in the case of a motor F running a vehicle. The motor, as indicated, is in the branch or multiple arc connection from the supply-wire to the return, consisting of the rails on which the vehicle moves.

The storage-battery, consisting of any desired number of cells, is indicated by the letter A. At the start, as at No. 1, the cells of the storage-battery would be coupled in series with the motor to oppose the maximum resistance to the flow of current. At stage No. 2 they would be coupled in a different combination—say in two multiple-arc branches—thus decreasing the resistance by increasing the number in multiple and decreasing the number in series with one another. At the next step, No. 3, there might be four multiple-arc branches, with a corresponding decrease in the resistance due to an increase of number in multiple and a decrease of the number in series. During these changes the batteries would obviously be receiving a charge from the trolley-wire while opposing the flow of current to the motor. At step No. 4 the batteries would be cut out and the motor connected directly to the trolley-wire. Step No. 5 involves the reversal of the batteries in the connection from the trolley-wire through the motor. At this step the batteries would be connected to apply the stored energy with a comparatively small voltage or electro-motive force through being at such time, as shown, arranged with their cells in four branches. Step No. 6 would involve the decrease of the number of branches and the increase of the number of cells in each branch, thus increasing the total voltage in the motor-driving circuit. Step No. 7 would consist in connecting the battery-cells all in series, as in No. 1, their connection, however, being such, as just described, that their voltage would assist the supply-current from the line in operating the motor.

I do not limit myself to connecting the batteries in the same combinations when they are charging and opposing and when they are discharging and assisting, and it is obvious that the combinations of the cells in steps Nos. 1, 2, and 3 might differ from the combinations in Nos. 5, 6, and 7, or that, when the battery is turned around in the circuit at step No. 5, it might be placed in circuit with the cells arranged in a less number of parallel circuits than in step No. 3, so that its voltage in discharge would be greater than in the particular arrangement shown at No. 5. It is also obvious that the number of steps before and after No. 4 might be made greater than the number before noted. These are modifications which will, obviously, readily occur to electricians as perfectly practicable in carrying out my invention.

Fig. 2 shows the use of the battery for running a car independently of the trolley-wire. In this case the connection of the trolley with the motor would be broken and a connection formed from one pole of the battery direct with one pole of the motor circuit, as indicated, while the other pole of the battery would be connected, as shown, by means of a switch B, through various sections of the field-magnet of the motor for the purpose of regulating the power or speed of the same when driven by the battery-current. The same regulation of speed could also be obtained, obviously, by connecting the cells of the batteries in different combinations of multiple arc and series. Constructions of switch suitable for producing the desired variations in the connection of the battery-cells are well known to electricians, and the construction may be indefinitely varied. I have, however, shown in Fig. 3, diagrammatically, an arrangement of switch-contacts and blocks that may be used for the purpose, but desire to state that this particular construction does not constitute the gist of my invention. In this figure but two sets of storage-batteries are indicated, this being the minimum number that may be advantageously employed to control the speed of the motor in accordance with my invention. In fact, in practice two sets may be the most desirable to use, since they will give the capacity of five different changes of speed, a number which electric-railway practice has shown to be ample. In the figure the several movable contact blocks or segments of conducting material are indicated as passing through a suitable base or block M, which may be flat or cylindrical in shape, as may be preferred, the figure being merely a projection or plan of the arrangement of switch-blocks and contacts engaging therewith.

The letters $a\ b\ c\ d\ e\ f\ g$ represent contact-blocks under which the plates secured to the base M may slide and make connection when the parts are moved in the direction of the arrow. The two sets of storage-battery are indicated at A A', while R is an ordinary resistance of sufficient conductivity to carry the total current for a short time.

F is the motor whose speed is to be regulated. These parts are all connected, as shown, to the several contacts $a$ to $g$, inclusive, as indicated. The object of the resistance R is to prevent sparking and short-circuiting of the batteries with each change of coupling, and also to avoid the break of the circuit with the several changes. The several positions of the switch device corresponding to five different speeds are indicated by the lines stop 1, stop 2, stop 3, stop 4, stop 5. The lines indicated by the figures 2' 3' show intermediate stages of the coupling. The contact-blocks on M being shaped as shown, it will be apparent on tracing the connections that at stop No. 1 the two sections of battery will be in the series connections from the trolley-wire to and through the motor. At the next intermediate stage of coupling, moving from step No. 1 to step No. 2, the resistance will be put in multiple with storage-battery A, and at the intermediate stage 3' battery A is taken from the circuit. On step No. 2 the resistance is out of circuit, and the two sections of storage-battery are coupled in multiple and in series with the motor. On step No. 3 the batteries are both disconnected from the circuit and the resistance is short-circuited, while the motor is directly connected with the trolley-wire through the wire 11, connecting the blocks at opposite ends of the base M. On step No. 4 the batteries are introduced into the circuit reversed and in multiple connection from contact $a$ being now by way of the wire 12, connecting one of the terminal blocks with one of the intermediate blocks, which now makes connection with contact $f$, and from contact $b$ joined to the opposite terminal of the batteries to the block connected by wire 11 with the terminal block on which contact $g$ bears. In step No. 5 the two sections of battery are in series with one another, but still in reverse position, so as to assist the energy applied from the trolley-wire.

What I claim as my invention is—

1. The herein-described method of regulating the speed of an electric motor run from a constant-potential circuit, consisting in variably opposing the flow of current to the motor by coupling storage-battery cells in the circuit leading through the motor from the supply-wire in various combinations, as and for the purpose described.

2. The herein-described method of regulating the speed of an electric-railway motor run from a constant-potential main, consisting in opposing the flow of current to the motor by coupling a storage-battery in circuit therewith, throwing out the storage-battery to obtain an increase of speed, and throwing the battery into circuit with the motor in reverse position, so that its charge acquired during low speed of the motor will assist the current flowing from the main when a still further increase of speed is desired.

3. The herein-described method of regulating the speed of an electric motor run from a constant-potential circuit, consisting in interposing storage-battery cells in the circuit of the motor at the start, increasing the number of cells of the battery in parallel while decreasing the number in series to increase the speed, and reversing the battery in the motor connection to produce further increase.

4. The herein-described method of regulating the speed of an electric motor run from a constant-potential main, consisting in interposing storage-battery cells in the circuit of the motor at the start, connecting the cells in different combinations in the circuit with the motor to decrease the resistance, cutting out the battery-cells, and finally reversing the battery-cells in the motor connection, so that they will add their voltage to that of the supply-line.

5. The herein-described method of regulating the speed of an electric motor run from a constant-potential main, consisting in interposing storage-battery cells in the circuit of the motor at the start, connecting the battery-cells in different combinations to decrease their resistance, cutting out the cells, reversing the cells in the motor connection to add their voltage to that of the supply-line furnishing current to the motor, and connecting the cells in different combinations to give an increased assisting voltage when a further increase of speed is desired.

6. The combination, with an electric-railway motor, of a storage-battery and means for connecting the cells thereof in different combinations in the circuit from the supply-wire through the motor, as and for the purpose described.

7. The combination of an electric-railway motor, of a storage-battery, a suitable switch for increasing the number of cells in parallel and decreasing the number of cells in series while the battery is in circuit with the motor, and switch contacts and connections for reversing the connections of the battery in the motor-circuit and also gradually decreasing the number of cells in parallel and increasing the number in series to produce increased speed.

8. The combination, with an electric-railway motor, of a storage-battery, means for changing the combination of battery-cells in circuit between the supply-wire and the motor either while the battery opposes the electromotive force of the supply-wire or assists the same, and suitable switch contacts or connections for disconnecting the battery and motor from the supply-wire and placing the battery on circuit through the motor independently of the supply-wire.

Signed at Scranton, in the county of Lackawanna and State of Pennsylvania, this 19th day of February, A. D. 1891.

MERLE J. WIGHTMAN.

Witnesses:
HORACE E. HAND,
H. H. SIVELLY.